United States Patent [19]
Walts et al.

[11] Patent Number: 5,508,505
[45] Date of Patent: Apr. 16, 1996

[54] HOLDER FOR HANDHELD PORTABLE BAR CODE SCANNER

[75] Inventors: Robert H. Walts, Rochester; Albert J. Ferland, Penfield; James B. Thornton, Webster, all of N.Y.

[73] Assignee: PSC Inc, Webster, N.Y.

[21] Appl. No.: 331,769

[22] Filed: Oct. 31, 1994

[51] Int. Cl.⁶ ..................................................... G06K 7/10
[52] U.S. Cl. ............................................ 235/472; 235/454
[58] Field of Search ..................................... 235/472, 454

[56] References Cited

U.S. PATENT DOCUMENTS 5,322,991  6/1994  Hanson ................................... 235/472

*Primary Examiner*—Harold Pitts
*Attorney, Agent, or Firm*—Joseph Francis Murphy

[57] ABSTRACT

In order to alleviate condensation which can cause window fogging or frosting conditions when the scanner is used in frigid environments as in refrigerated warehouses, a holder for the scanner is provided which may be located on a forklift or at a strategic location where rapid temperature changes can occur. The holder defines a chamber having doors defined by brushes which contact each other and which are located at one end and across at least a part of the bottom of a housing providing the chamber. The bar code scanner has a head and a handle which may be inserted through the end door into the chamber and supported by a shoulder surface of the bottom of the head around the handle. The doors seal the chamber while having sufficient permeability to allow the escape of moisture. The inside of the chamber may be heated to a temperature which alleviates any fogging. The operator may insert the scanner into the holder from time to time to alleviate condensation, fogging or frost formation and to maintain the scanner in its temperature operating range.

8 Claims, 4 Drawing Sheets

HOLDER FOR HANDHELD PORTABLE BAR CODE SCANNER

The present invention relates to bar code scanning systems and particularly to a holder for a handheld, portable bar code scanner (also known as a bar code reader) of the gun type having a head and a handle in which a bar code scanner may be inserted and supported in sealing relationship from the environment external of the holder.

The present invention is especially suitable for use in bar code scanner systems which operate in frigid environments, such as in refrigerated warehouses and freezers, for example at strategic locations adjacent entrance ways into and out of the environment or on vehicles (such as forklift trucks) which may travel about the environment. Under humid conditions and/or where the temperature outside the refrigerated environment is high, the scanner, particularly the window through which the scanning beam projects, may become fogged or frosted, especially where rapid temperature changes occur as the scanner is carried into and out of the refrigerated environment. Also condensation may occur which can affect scanner system reliability by causing damage to electrical components of the scanner. The holder provided by the invention may be used to alleviate these conditions.

Bar code scanners having a gun-like shape with a head and a handle depending from the head are described in U.S. Pat. No. 5,200,597 issued Apr. 6, 1993 to Jay M. Eastman, et al. It is desirable to protect such scanners against problems caused by condensation on the scanner surfaces, such as the window through which a laser beam projects and through which return light is received (fogging or frost on the window) as well as other condensation which may affect the reliable operation of electrical circuits of the scanner. The solution of this problem is necessary to enable bar code scanners to operate under fridged or freezer-like environmental conditions. It is further desirable to resolve the condensation problem without resorting to redesign of the scanner to incorporate heating elements. Such heating elements drain electrical power and are undesirable for portable scanner operation.

It is a feature of the present invention to provide an improved holder for a handheld portable bar code scanner having a chamber into which the bar code scanner may be inserted and supported in sealed off relationship from the environment external of the chamber.

Another feature of the invention is to provide an improved holder in which a bar code scanner may be located and isolated from temperature and humidity in an environment external to the holder.

It is a still further feature of the invention to provide an improved holder where an entrance to a chamber in the holder, which may be heated, is via doors which provide sufficient sealing effect and enable the scanner to be held in supported relationship on the doors after being inserted into the holder.

Briefly described, a holder for a bar code scanner embodying the invention has a housing which defines an internal volume or chamber sufficiently large to contain the head and a portion of the handle of the scanner. Openings into the bottom and one end of the housing contain doors through which the head and the handle may be inserted easily by the operator and via which the scanner can be removed for use. These doors are preferably provided by brushes which are sufficiently stiff, at least in the case of the brush providing the door at the bottom of the housing to support the scanner on a shoulder surface between the handle and the bottom of the head of the scanner. The chamber may contain a heater, preferably in the form of a mat which surrounds a plurality of the sides of the head and is maintained at a temperature to dissipate condensation on the window of the head which provides a port for the optical beam which illuminates the bar code and for return light from the bar code.

The foregoing and other objects, features and advantages of the invention, as well as presently preferred embodiments thereof, will become more apparent from a reading of the following description in connection with the accompanying drawings in which.

Figure 1:
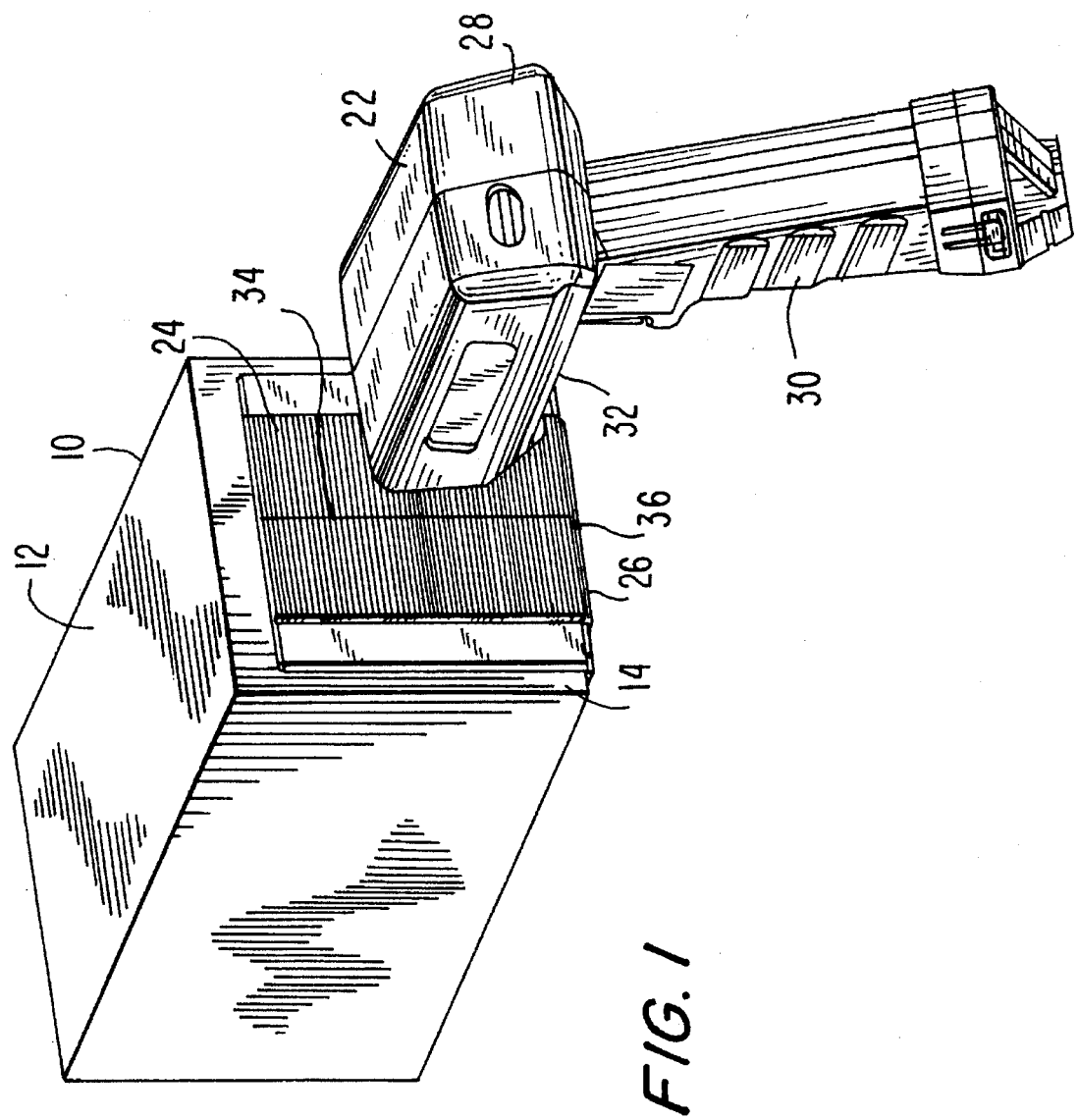
FIG. 1 is a perspective view showing a holder and a bar code scanner which may be inserted into and held in the holder.
Figure 2:
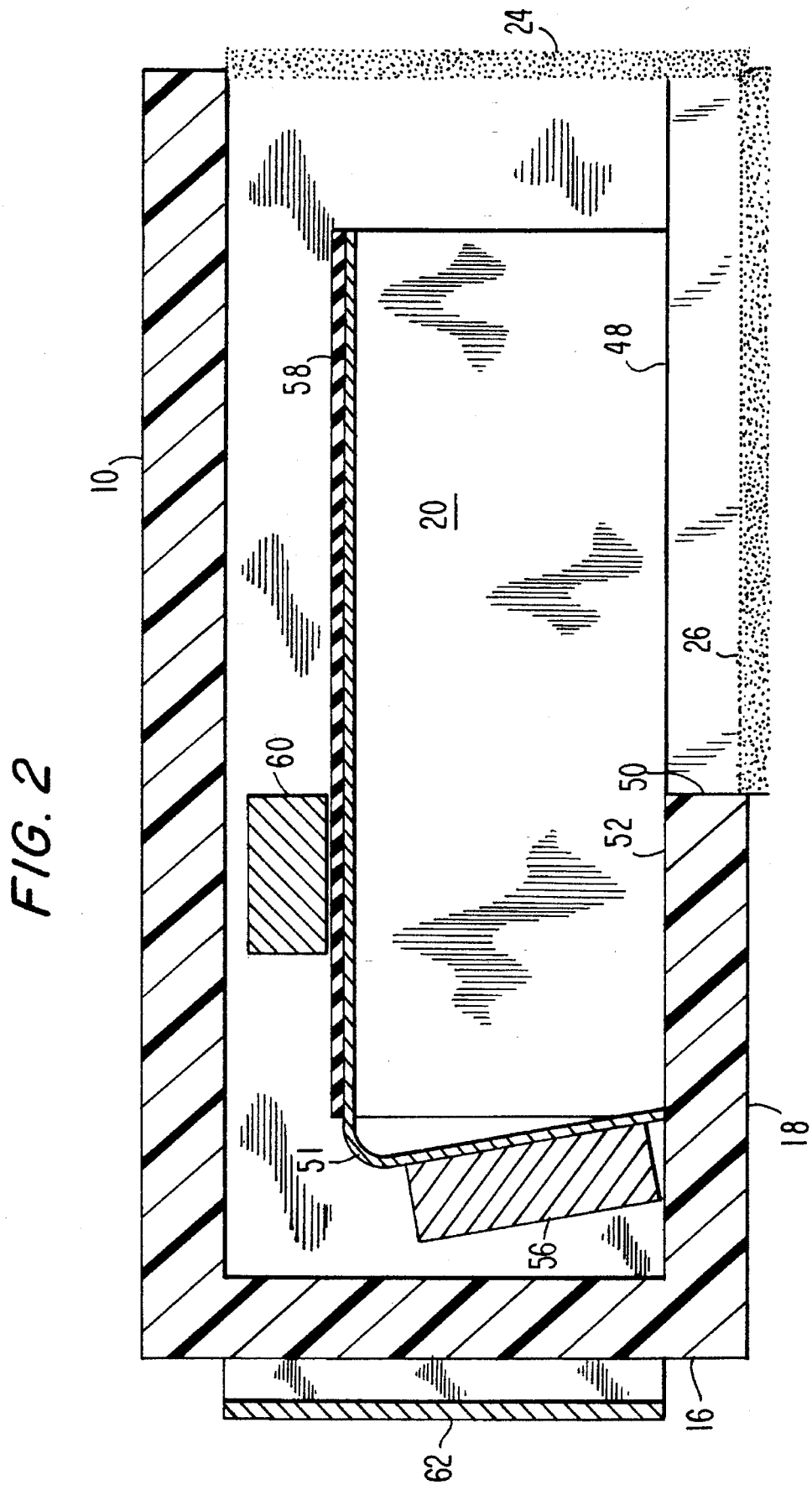
FIG. 2 is a cross-sectional view along a vertical plane through the holder shown in FIG. 1.
Figure 3:
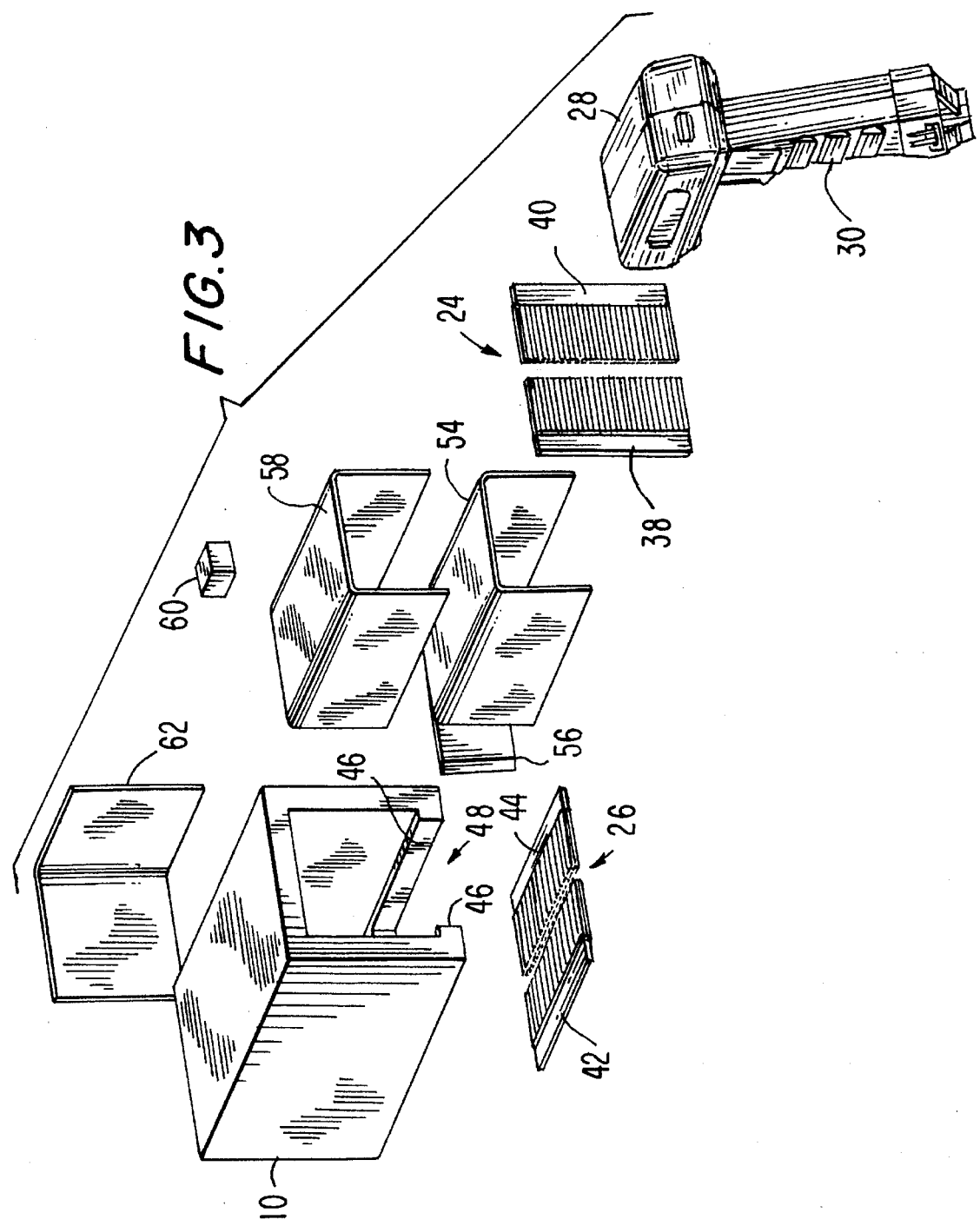
FIG. 3 is an exploded view showing the parts of the holder illustrated in FIGS. 1 and 2 and also showing the bar code scanner in the same positional relationship to the holder as shown in FIG. 1.

Referring to FIGS. 1, 2 and 3 there is shown a generally rectangular housing 10 which is preferably injection molded from plastic material, such as a polycarbonate material reinforced with glass fibers. The material provides the housing with insulating properties. The housing has a top 12, a front end 14, a rear end 16 and a bottom 18.

The inside surfaces of the top, bottom, front and rear ends define an internal volume which forms a chamber 20 into which a portable handheld bar code scanner 22 may be inserted via doors 24 and 26 in the front end 14 and on bottom 18, respectively.

The scanner 22 is of the type described in the above referenced Eastman, et al. patent and has a head 28 and a handle 30. The handle 30 depends from the head and is narrower than the head to define a shoulder region 32 around the handle. The doors 24 and 26 are brushes having bristles which contact each other along a joint 34 in the front end door 24 and a joint 36 in the bottom door 26. The bristles are attached to base members 38 and 40 for the front end brush and base members 42 and 44 for the bottom door brushes. These base members are attached along shelves or ribs 46 in a notch 48 in the bottom 18 of the housing 10. The notch extends approximately 60% of the length of the bottom to a rear surface 50 of the notch 48. The front end of the underside or shoulder surface 32 rests on an inside surface 52 at the bottom of the chamber 20. The remainder of the shoulder region 32 rests on the brushes forming the door 26 which are sufficiently stiff (suitably made of nylon bristles) to support the weight of the scanner 28 yet enable the scanner to be inserted either through the front end door 24 or through the bottom door 26 or both.

The joints 34 and 36 of the brushes 24 and 26 engage each other prior to insertion of the scanner 22. After the scanner is inserted the joint 34 in the front end brushes closes to form a first seal. The bristles of the brushes in the bottom door 26 conform to the region of the handle in the immediate vicinity of the bottom of the head 28 forming another seal. These seals isolate the chamber 20 and the head and upper handle region of the scanner 22 from the environment external of the housing 12.

The housing 12 has a heater bracket 54 which is generally trough shaped and surrounds a region in the chamber 20, above the bottom and below the top of the housing where the scanner head is located when the scanner is in the chamber. This bracket may be formed from aluminum. At the rear end of the bracket is an electrical module 56, which provides a power supply, such as a transformer which converts the available source of power say on a fork truck or in the refrigerated warehouse to approximately 12 volts for operating a heater mat 58. This power supply is optional and may be external of the housing or part of associated equipment. The mat 58 is also trough shaped and conforms to the heater bracket 54. This heater mat may contain a heater element by being formed of silicone rubber. The heater mat may be assembled to the heater bracket with adhesive. A thermostat 60 is located on top of the heater mat and senses the temperature in the chamber 20 so as to control the electrical current from the power supply to the heater mat to maintain the temperature in the chamber, say at a temperature of between 95 to 100 degrees fahrenheit.

A mounting bracket 62 which may be used to mount the housing 10 either on a side of the forklift truck or on a support in the refrigerated warehouse, say near an entrance to the warehouse, is attached to the rear end 16 of the housing. Since the bracket 62 is at the rear end, it supports the holder cantilevered from a support structure such as along side the cab of a fork lift truck or a wall or column inside the warehouse near the entrance to the refrigerated area thereof.

Figure 4:
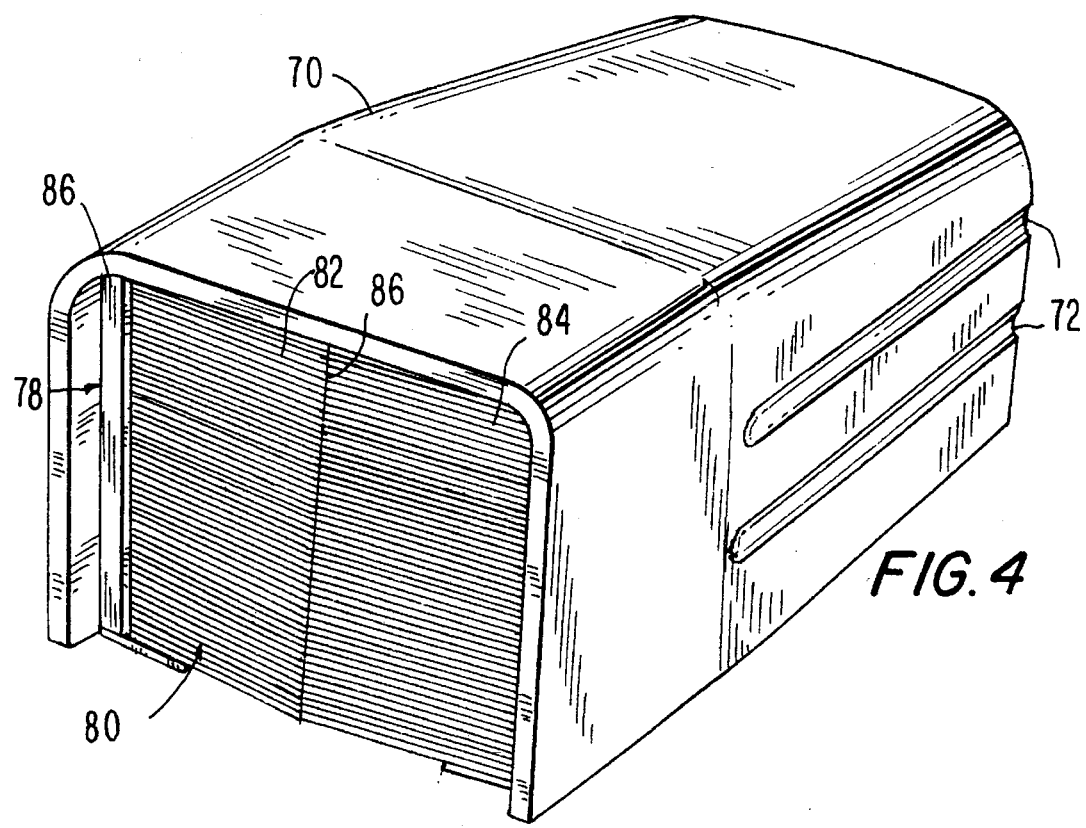
FIG. 4 is a perspective view of a holder in accordance of another embodiment of the invention.
Figure 4A:
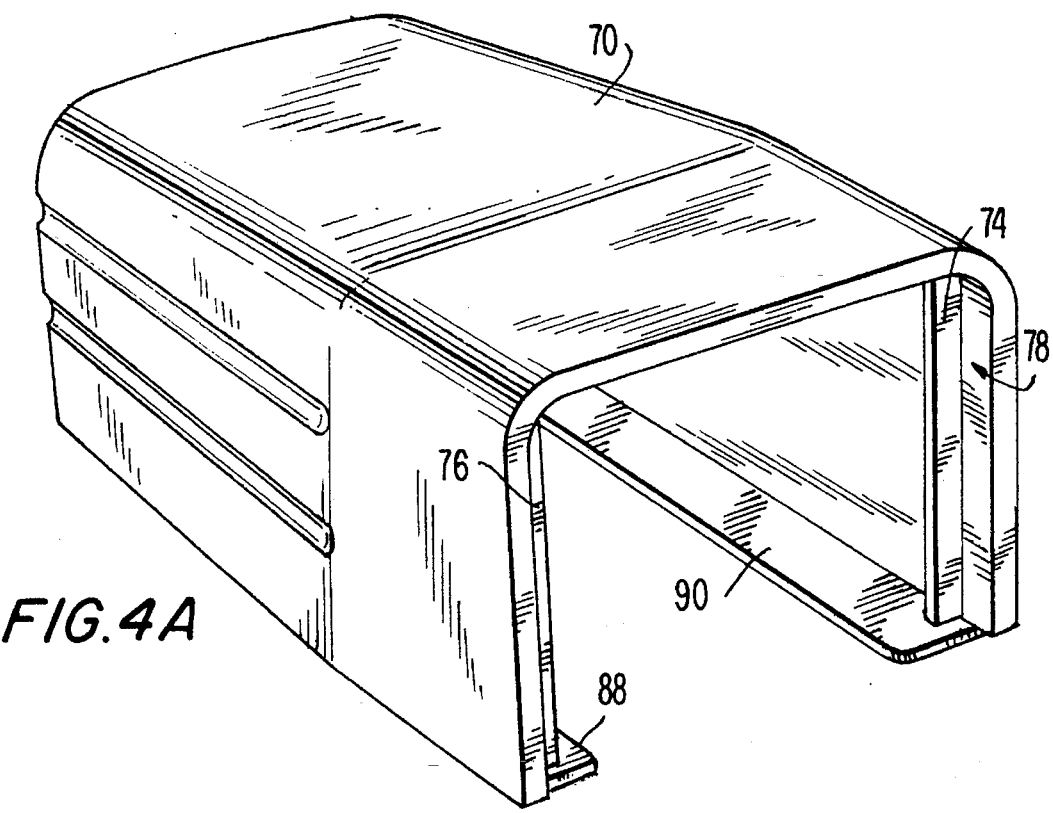
FIG. 4A is a perspective view of the casing of the holder before installation of the brush doors at the front end and bottom thereof.

Referring to FIGS. 4 and 4A there is shown another holder 70 made of reinforced injection molded plastic material. The housing is beveled rearwardly and has sculptural details such as grooves 72 to enhance the appearance of the holder. The casing has shelves or ribs 74 and 76 paralleling the front end opening 78. A door 80 in the front end is provided by brushes 82 and 84 extending from base members 86. These base members are attached to the ribs 74 and 76 which are recessed into the housing 70 from its front end opening 78. The brushes 82 and 84 have bristles which contact at their free ends forming the sealing joint 86 of the front door 80.

The bottom door is mounted on horizontally extending and inwardly projecting shelves or ribs 88 and 90 and function in the same way as the brushes providing the bottom door 26.

In operation, there is sufficient permeability through the brushes constituting the doors to allow the escape of moisture as condensation evaporates from the bar code scanner. As an example of operation within a freezer which is maintained at a temperature of minus 32 degrees Fahrenheit and where the heater provides an environment in the chamber 20 at 95 degrees Fahrenheit, it is desirable to place the scanner in the holder from 2.5 to 6.5 minutes so as to relieve fogging and frosting conditions at the window after a period of 60 seconds of scanning operation outside of the holder.

Variations and modifications in the herein described holder within the scope of the invention will undoubtedly suggest themselves to those skilled in the art of scanner systems applications. Accordingly the foregoing description should be taken as illustrative and not in a limiting sense.

I claim:

1. A holder for a bar code scanner having a head and a handle attached to and depending from the head, said handle being narrower than said head so that said head defines the shoulder on opposite sides of said handle, said holder comprising a housing having ends, a top, a bottom, and sides which define an internal volume sufficiently large to contain said head and a portion of said handle which is adjacent to said head, an opening into said housing through at least a portion of said bottom adjacent to said one of said ends and through said one of said ends, and flexible doors across said portion and said one end for receiving said scanner head within said housing in sealed relationship therewith.

2. The holder in accordance with claim 1 wherein said doors each comprise a pair of brushes having bristles extending inwardly toward each other from the sides of said housing into contact with each other at a joint.

3. The holder according to claim 1 wherein said bottom has shelves along the sides thereof which support said shoulder when said scanner head is inserted into said housing through said door in said end thereof.

4. The holder according to claim 1 further comprising a mounting bracket on the end of said housing opposite to said one end for mounting said housing cantilevered in supported relationship with a support structure.

5. The holder in accordance with claim 3 wherein said bottom has a portion extending to the end of said housing opposite to the end thereof having said door which portion defines a shelf for supporting said head forwardly of said shoulder.

6. The holder in accordance with claim 1 further comprising an electrical heater unit provided by a mat having a top and side and sufficiently large to encompass said head and disposed in said internal volume between said sides and below said top, and means for mounting said heater mat in said housing inwardly of said one end of said housing and between the bottom and top of said housing.

7. The holder in accordance with claim 6 further comprising means for energizing said mat and maintaining said housing in enclosed volume at a desired temperature to reduce condensation on said head when said scanner is used under frigid environmental conditions.

8. The apparatus in accordance with claim 1 wherein said housing is a molded body of insulating plastic material.

* * * * *